C. D. SEEBERGER.
CABLE.
APPLICATION FILED JULY 22, 1907. RENEWED AUG. 26, 1910.

989,539.

Patented Apr. 11, 1911.

Witnesses:

Inventor.
C. D. Seeberger
By Coburn & McRoberts
his Attys

UNITED STATES PATENT OFFICE.

CHARLES D. SEEBERGER, OF YONKERS, NEW YORK.

CABLE.

989,539.  Specification of Letters Patent.  Patented Apr. 11, 1911.

Original application filed June 6, 1896, Serial No. 594,537. Divided and this application filed July 22, 1907, Serial No. 384,877. Renewed August 26, 1910. Serial No. 579,158.

*To all whom it may concern:*

Be it known that I, CHARLES D. SEEBERGER, a citizen of the United States, residing at Yonkers, in the county of Westchester and State of New York, have invented certain new and useful Improvements in Cables, of which the following is a specification, reference being had therein to the accompanying drawing.

My invention relates to cables which are especially adapted to be employed as hoisting cables for elevators and similar structures, although of course their use is not limited to such devices as they may be employed in any suitable relation.

The invention consists in the arrangements and combinations of parts hereinafter particularly described and then pointed out in the appended claims, this application being a division of my application filed June 6th, 1896, Serial Number 594,537.

Figure 1:
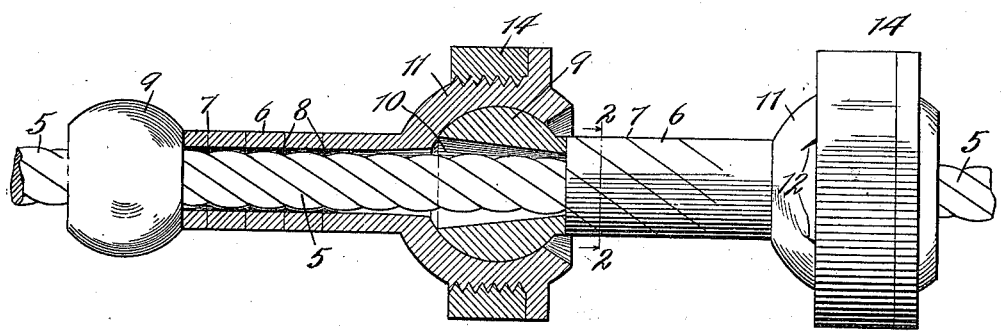
Figure 3:
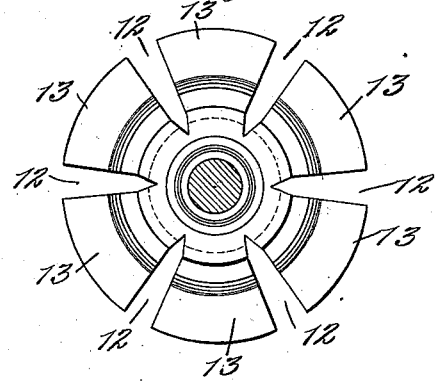
Figure 2:
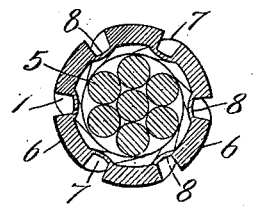

In the accompanying drawing in which the same reference numerals apply to similar parts shown in the different figures; Figure 1 is a view in elevation, partly in section, of a cable embodying my invention; Fig. 2 is a sectional view thereof on the line 2—2 of Fig. 1, showing the parts before the links are compressed on the cable; and Fig. 3 is a detail view of the socket of one of the links before being clamped upon its respective ball.

In the drawing the numeral 5 refers to a length of ordinary wire rope or cable, upon which are threaded a series of ball and socket links. Each link, which is preferably made of malleable iron, comprises a body portion of tubular form 6, provided with spiral grooves 7, which extend nearly through the sleeve, leaving thin webs 8. Each link terminates at one end in a ball-head 9, which is provided with a tapered perforation 10 in projection of the hollow tubular portion of the link. The other end of the link forms a cup-shaped socket 11, adapted to receive the ball of the link adjacent. The socket is partially divided, in the direction of the length of the link, by a series of slots 12, separating the socket into a series of tongues 13. These tongues flare outward before the links are put together, as shown in Fig. 3. To couple the links upon the cable the tubular portion of each link is compressed thereon, the webs 8 registering and engaging with the spirals of the cable. The ball of one link is then introduced into the socket of the adjacent link and the tongues constituting the socket are then clamped down and around the ball and are held in such position by a collar 14, which may be screwed or otherwise secured on the outside of each socket. By this construction I avail myself of the tensile strength of the wire rope or cable itself as well as of the link construction surrounding the same; and provide the cables with spaced projections which are adapted to engage with the surfaces of the associated hoisting sheaves, which may be constructed to register therewith; and by stretching the wire as it is formed up into the above described cable I avoid the subsequent stretching after the same has been in continuous use.

What I claim, therefore, and desire to secure by Letters Patent is:

1. A cable comprising a rope, and ball and socket links inclosing said rope.

2. A cable consisting of a rope and inclosing links, each link comprising a body portion, a ball at one end, and a socket at the other adapted to inclose the ball of the adjoining link.

3. A hoisting cable comprising a wire rope surrounded by ball and socket links, each link consisting of a tubular body portion clamped about the wire rope, of a ball-head, and of a split-socket adapted to be clamped about the ball-head of the link adjacent.

4. A hoisting cable comprising a wire rope surrounded by ball and socket links, each such link comprising a tubular body portion provided with spiral grooves, and webs adapted to fit in the twist of the wire rope when the said link is clamped about the same, a ball-head, and a split-socket adapted to be clamped about the ball-head of the link adjacent.

5. In a hoisting cable, a wire rope, ball and socket links inclosing the said cable comprising a tubular body portion adapted to be clamped about the cable, a ball-head, and a split-socket adapted to be clamped about the ball-head of the adjoining link, and screw-threaded upon its exterior, and collars adapted to be secured upon the exterior of the socket.

In testimony whereof I affix my signature in presence of two witnesses.

CHARLES D. SEEBERGER.

Witnesses:
ELIZABETH MOLITOR,
J. MCROBERTS.

Copies of this patent may be obtained for five cents each, by addressing the "Commissioner of Patents, Washington, D. C."